(No Model.)
W. H. BLUE.
LATHE MANDREL.
No. 291,282. Patented Jan. 1, 1884.
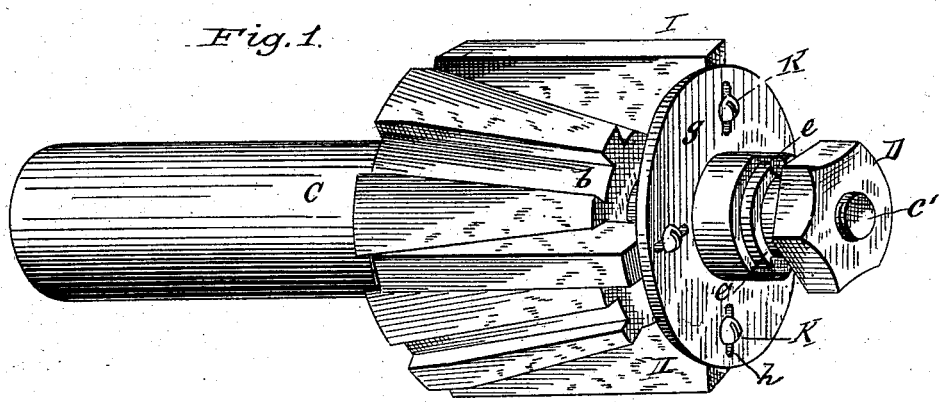
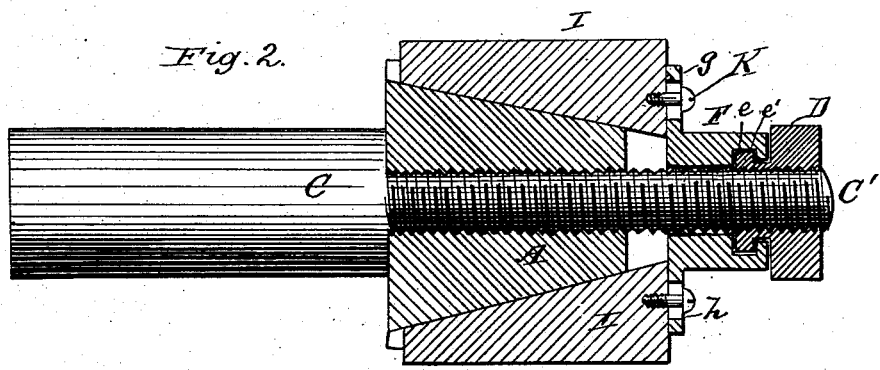
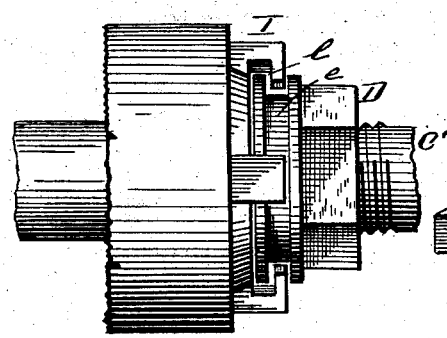
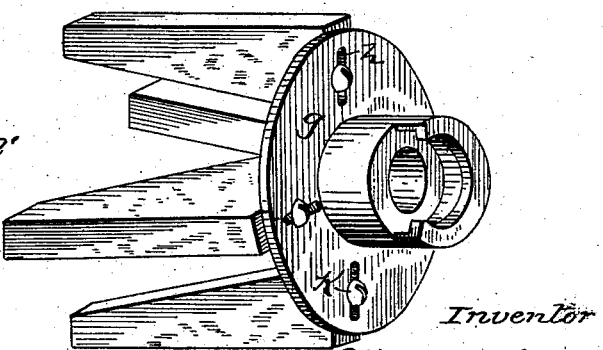
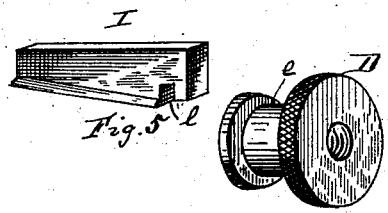
Witnesses:
Inventor
W<sup>m</sup> H Blue
Attorney

UNITED STATES PATENT OFFICE.

WILLIAM H. BLUE, OF GRAFTON, WEST VIRGINIA.

LATHE-MANDREL.

SPECIFICATION forming part of Letters Patent No. 291,282, dated January 1, 1884.

Application filed July 27, 1883. (No model.)

*To all whom it may concern:*

Be it known that I, WILLIAM H. BLUE, a citizen of the United States of America, residing at Grafton, in the county of Taylor and State of West Virginia, have invented certain new and useful Improvements in an Adjustable Lathe-Mandrel and Pipe-Center; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to expanding mandrels or work-holders adapted for centering tubular articles for any purpose and for attachment to lathe-mandrels for holding hollow articles to be turned or polished.

The object of the invention is to provide a tool of this class having a wide range of expansion, and which is strong and cheap in construction, easily and quickly operated, reliable in action, and not liable to get out of order.

The invention consists in certain novel constructions and combinations of devices, which will be readily understood from the following particular description, in connection with the accompanying drawings, in which—

Figure 1 is a perspective view of an expanding mandrel and centering-tool constructed according to my invention. Fig. 2 is a section in a plane cutting two diametrically-opposite jaws longitudinally. Fig. 3 is a perspective view of the flanged jaw-thimble and jaws, the flanged nut detached. Fig. 4 is a side elevation of a modified form of the tool, and Fig. 5 represents details of the same.

Referring to Figs. 1 and 2, the letter A indicates a head having the shape of a frustum of a cone bored centrally and screw-threaded, and having in its outer surface longitudinal grooves b, extending through its entire length. These grooves are preferably arranged in equidistant pairs, the two grooves of each pair being diametrically opposite each other. The head is screwed upon a shank, C, which has a screw-threaded portion, C', projecting from the smaller end of the said head, and provided with a nut, D, having a flanged collar, e.

Upon the portion C' of the shank is loosely fitted a thimble, F, having an internal groove, which loosely embraces the flange e' of the collar e of the nut, the thimble being cut away, as shown, at one side, to permit the flange to be inserted laterally into the groove before the nut and thimble are placed upon the shank. The thimble F has a wide flange, g, provided with radial slots h the same distance apart as the grooves in the head A. The grooves of the head are preferably dovetailed or undercut, and in them are arranged correspondingly-dovetailed longitudinally-adjustable jaws I, having the shape of a right-angled triangle, their oblique edges being in the grooves, and their wide ends or bases being against the flange g of the thimble F. Headed pins or screws K pass through the slots h and into the jaws, so as to attach the jaws to the flange g, and at the same time permit them to move radially. When the parts are arranged as now described, and shown in the drawings, it is obvious that when the nut D is screwed inward the flange g of the thimble F will be forced against the ends of the jaws and drive said jaws toward the wide end of the head, the inclined bottoms of the grooves forcing the jaws at the same time outward, or expanding the set of jaws so that they will come in contact with the interior surface of any hollow article of suitable size which may be placed upon the mandrel, or in which it may be inserted, and such article will be held with greater or less firmness, according to the adjustment of the nut. The jaws may of course be adjusted to hold hollow articles of various sizes of cavity within their range of radial movement. The shank of the head may be a lathe-mandrel or a revolving spindle of a polishing-machine, and when applied to such use the head may be formed in one piece with the mandrel or spindle and provided with a screw-shank projecting from its smaller end.

In the modification shown in Fig. 4, the thimble F is dispensed with and the jaws I are provided with notches l, which embrace the flange of collar e. In other respects the construction is the same as heretofore described.

It will be obvious that the head and jaws may be shaped to hold hollow articles having cavities of any shape.

Having now described my invention and explained the operation thereof, I claim—

1. In combination with the shank C, having a reduced screw-threaded portion, C', integral therewith, and the tapered head A with grooves $b$ formed therein, the tapered jaws I, provided with means for attachment to an adjusting-nut for expanding and contracting the jaws, substantially as set forth.

2. In combination with the shank C, provided with a reduced screw-threaded portion, C', forming an attaching means for the grooved head A, the jaws I, secured within said grooved head and connected to a slotted flange, $g$, having an outwardly-extended portion, F, adapted to embrace the flanged and grooved nut D, the parts being organized substantially as shown, and for the purpose set forth.

In testimony whereof I affix my signature in presence of two witnesses.

WILLIAM H. BLUE.

Witnesses:
F. B. BLUE,
W. R. D. DENT.